United States Patent Office 3,358,306
Patented Dec. 19, 1967

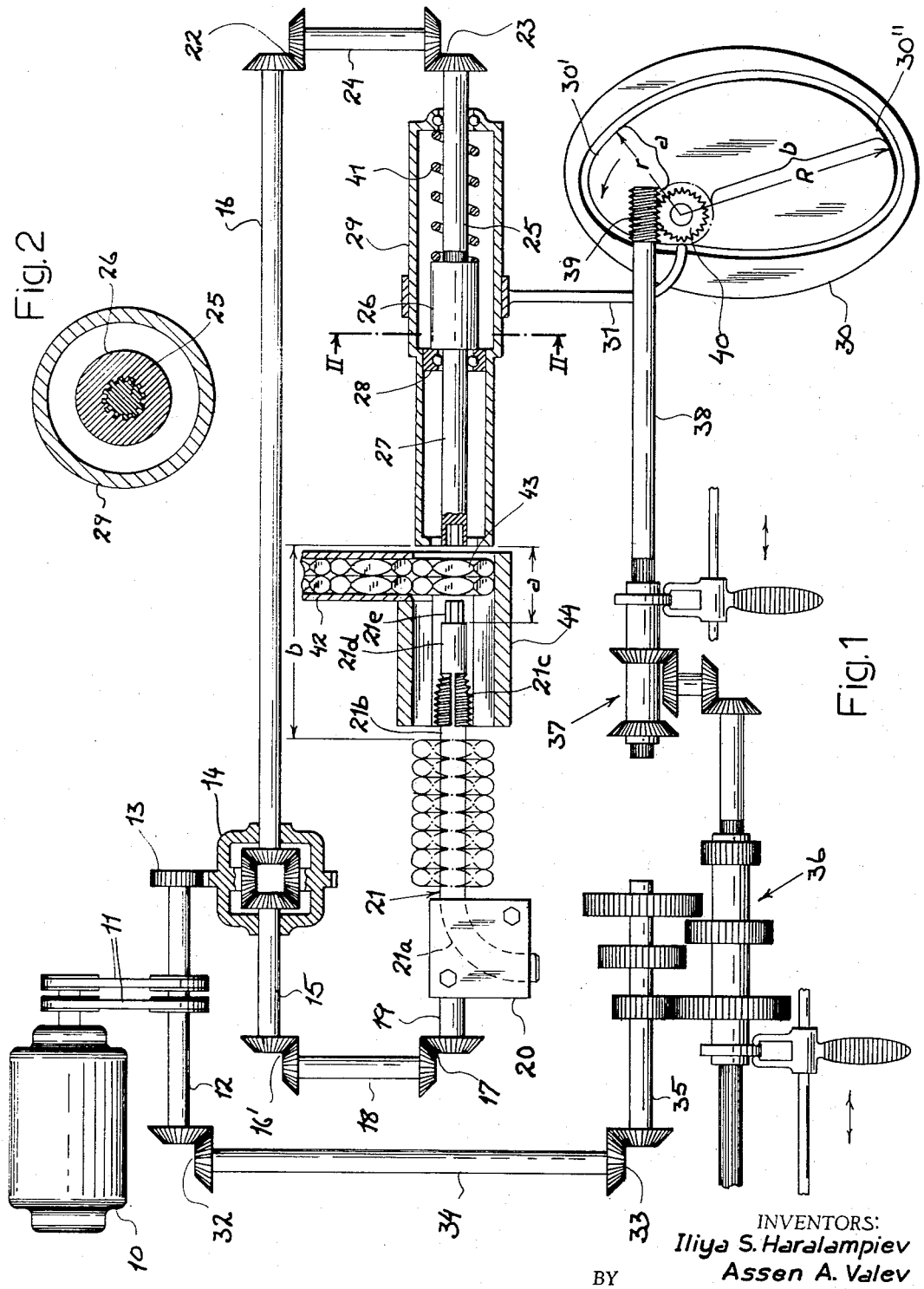

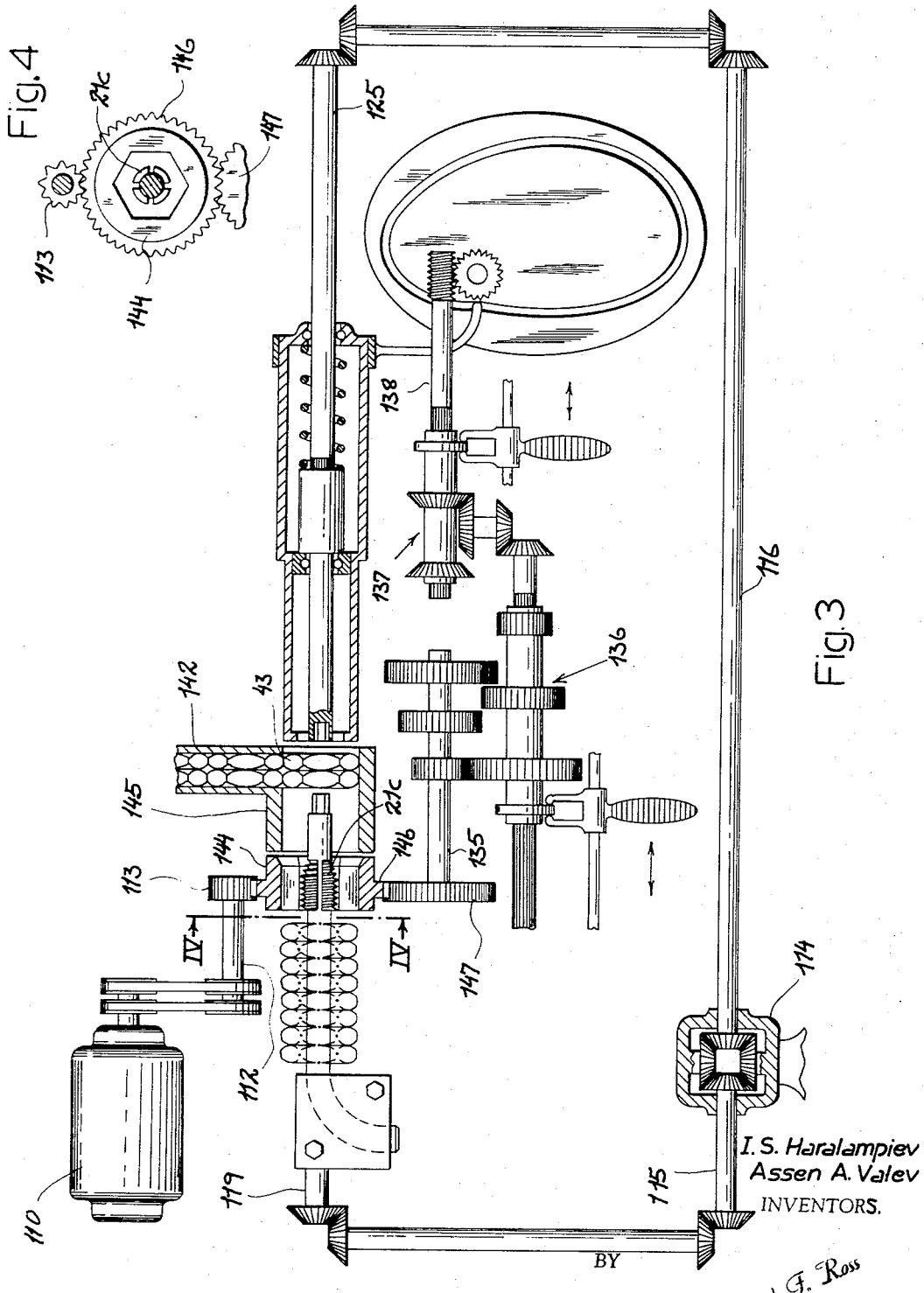

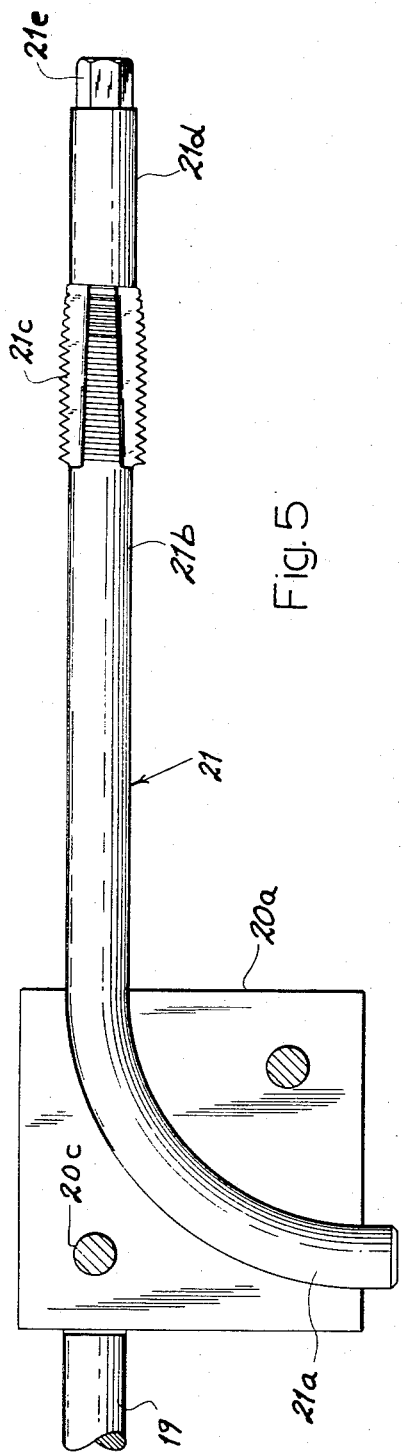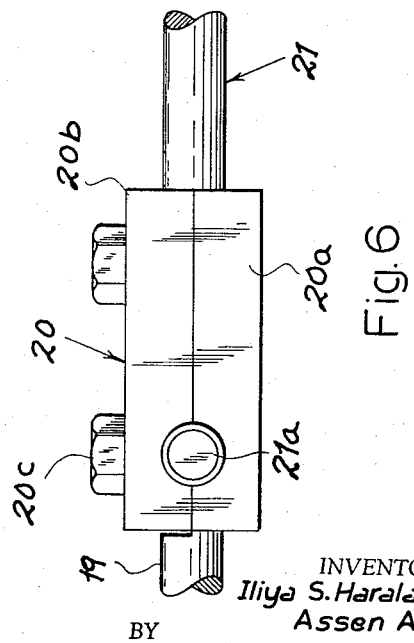

3,358,306
AUTOMATIC NUT TAPPER
Ilija Stoilkov Haralampiev and Assen Atanassov Valev, Sofia, Bulgaria, assignors to Darjavno Stopansko Obedinenie Metaloobrabotvashti i Darvoobrabotvashti Mashini i instrumenti, Sofia, Bulgaria, a corporation of Bulgaria
Filed Aug. 17, 1965, Ser. No. 480,461
Claims priority, application Bulgaria, Aug. 17, 1964, I-661
5 Claims. (Cl. 10—133)

ABSTRACT OF THE DISCLOSURE

A machine for automatically internally threading nut blanks wherein a pair of axially aligned spindles are provided at confronting extremities with a gripper adapted to engage nut blanks fed between them from a magazine and a mechanism for axially shifting the blanks onto one of the spindles carrying a tap while effecting relative rotation between the tap and the nut blank, the spindles being driven from a common motive source at their extremities remote from the gripper via a torque-equalizing differential in the drive chain between the spindles.

---

Our present invention relates to a machine for the cutting of female threads on a tubular workpiece, such as a nut.

Short tapping tools suitable for this purpose are generally gripped at one end by a chuck and inserted at the other end into a bore of the workpiece to be threaded.

In many instances it is convenient to use a tapping tool of an overall length substantially exceeding the length of its effective cutting portion, i.e. the tooth part of the tool, in order to provide an extension on which successive nuts or similar workpieces can be accumulated before the machine is arrested to permit the removal of the finished workpiece. In practice, however, it has heretofore not been possible to use such elongated tapping tools because of the vibrations which the unsupported working end of the tool would experience in operation.

It is, therefore, an object of our present invention to provide means for facilitating the use of such elongated tapping tools in a threading machine of the character set forth, thereby enabling the machine to be run without interruption through a succession of work cycles.

Another object of this invention is to provide means for steadying a tapping tool in a nut-threading or similar machine to improve the quality of the products.

In accordance with this invention we provide, as part of a thread-cutting machine, an axially fixed holder adapted for clamping engagement with an end of a tapping tool, advantageously a tool having a curved rear extremity whereby the tool can be more positively located in the holder without the use of special gauges; axially spaced from this holder, at a location beyond the opposite or working end of the engaged tool, a gripper is axially reciprocable between a normal position remote from the tool and a working position in which the gripper positively engages the proximal or forward end of the tool which for this purpose is being given a suitable polygonal or other noncircular shape. An inlet located between the front end of the tool and the normal position of the gripper allows for the introduction of a workpiece into the intervening space, this workpiece being then advanced into contact with the thread-cutting portion of the tapping tool by a pusher which yieldably entrains the gripper, e.g. through the intermediary of a compression spring, in an initial stage of its working stroke. The tapping tool, accordingly, should have a smooth-surfaced front portion ahead of its thread-cutting portion, this front portion being long enough to accommodate the workpiece (or several juxtaposed workpieces to be threaded concurrently) while the gripper advances into contact with the tool; after this contact has been made, and with the tool thus steadied at both ends, the pusher further advances the workpiece or workpieces over and beyond the thread-cutting portion of the tool until they arrive at the rearward extension thereof.

During the thread-cutting operation proper, relative rotation must be imparted to the workpiece, on the one hand, and the tool-engaging holder and gripper, on the other hand, by a driving mechanism properly synchronized with the forward motion of the pusher. To this end, the workpiece is peripherally engaged by a sleeve, e.g. of hexagonal profile, which is either stationary or driven and which controls the angular position of the workpiece in the region of the thread-cutting portion so as to secure the workpiece against rotary entrainment by the driven tool or to rotate the workpiece around the stationary tool.

In either case, according to a more specific feature of our invention, the two tool-engaging elements (holder and gripper) are advantageously interconnected by a limitedly yieldable coupling enabling only slight rotation of the two ends of the tool under severe torsional stresses. A restrictive coupling of this type may include a differential gear train whose housing is either fixed or directly coupled to the drive means, depending on whether rotation is to be imparted to either the nut or the tool. The main drive, which rotates the workpiece or the tool, and/or the pusher drive, which is synchronized therewith, may be equipped with conventional speed-changing means to permit changes in the pitch of the thread to be cut. One of these drives may also be reversible, independently of the other, to facilitate switching from right-hand to left-hand threads or vice versa.

The invention will be described in greater detail with reference to the accompanying drawing in which:

FIG. 1 is a diagrammatic view of a machine embodying our invention;

FIG. 2 is a cross-sectional view taken on the line II—II of FIG. 1;

FIG. 3 is a view similar to FIG. 1, showing a modified machine embodying the invention;

FIG. 4 is a cross-sectional view taken on the line IV—IV of FIG. 3;

FIG. 5 is an enlarged plan view of a tapping tool adapted to be used in the machine of FIG. 1 or 3, along with part of a clamp therefor; and FIG. 6 is a side view of the tool-holding clamp shown in FIG. 5.

In FIG. 1 we have shown a motor 10 driving, via a transmission 11, a shaft 12 which powers, via a gear 13, a differential housing 14 having two output shafts 15 and 16. Shaft 15 is coupled, by way of bevel gears 16, 17 and an intermediate shaft 18, with a drive shaft 19 having a tool holder 20 secured thereto. This tool holder is clamped, in a manner more fully described hereinafter in connection with FIGS. 5 and 6, to a tapping tool 21 having a curved rear extremity 21a and an elongated body 21b in line with shaft 19, this body including a thread-cutting portion 21c, a forward extension 21d of substantially the same length as working portion 21c, and a tip 21e of polygonal (e.g. hexagonal) outline.

Output shaft 16 is connected via bevel gears 22, 23 and a transverse shaft 24 with a splined drive shaft 25 which is telescoped in and matingly engaged by a tubular extension shaft 26 terminating in a gripper 27 with a socket-shaped extremity having a polygonal profile complementary to that of the front end 21e of tapping tool 21. Shaft assembly 25, 26 is rotatably and slidably mounted, via bearings 28, in an axially reciprocable tubular pusher member 29 whose reciprocation is controlled by a continuously rotating cam 30 via a follower 31. The means for driving the cam 30 in step with the shafts 19 and 26 include bevel gears 32, 33 by which the torque of shaft 12 is transmitted first to an auxiliary shaft 34 and then to another auxiliary shaft 35 which is coupled by way of a speed changer 36 and a reversing gear 37 with a drive shaft 38 bearing a worm 39 in mesh with a worm gear 40 on the shaft of cam 30. The forward stroke of the reciprocation of pusher 29, i.e. the beginning of its leftward motion from the illustrated normal position thereof, is communicated to the telescope shaft 26 and gripper 27 through a compression spring 41 interposed between shaft 26 and pusher 29. In this normal position, a space exists between pusher 29 and gripper 27, on the one hand, and the end 21e of tapping tool 21, on the other hand, this space being aligned with a hopper 42 from which one or more workpieces, such as pairs of juxtaposed nut blanks 43, can be fed into the gap between the pusher assembly and the tool. The workpieces 43 are received in a sleeve 44 which, in the region surrounding the tool portions 21c and 21d, is of polygonal (preferably hexagonal) profile to match the outline of the workpieces 43 whereby the latter are angularly immobilized upon being advanced into the sleeve 44 by the steadily moving pusher 29.

Cam 30 has a lower dwell 30' of a radius r corresponding to the distance between the end of tool section 21d and the gripper 27 in its normal withdrawn position, thus a distance greater than the combined width of the nuts 43 persent in the gap between the tool and the gripper. The cam also has a higher dwell 30" of radius R corresponding to the distance measured from the end of pusher 29 (in its normal withdrawn position) to a point beyond tool portion 21c. In operation, therefore, pusher 29 advances the workpieces first into a position just ahead of the thread-cutting portion 21c of tool 21 within the sleeve 44; simultaneously, the gripper 27 entrained by the spring 41 has matingly engaged the tip 21e of the tool so that both ends of the tool are positively driven with substantially equal torques from the output of differential 14. The pusher 29 then continues its advance until the tool has passed the threading portion 21c and has landed on the storage portion 21b; during this part of the stroke the spring 41 is compressed without any further advance of the engaged gripper 27. Finally, the pusher assembly 26–29 is retracted during the return stroke of the cam drive and the parts are restored to their normal position illustrated in FIG. 1.

After the maximum permissible number of workpieces have accumulated on the stem 21b of the tapping tool 21, the machine is stopped and the clamp 20 is opened to enable removal of the tool and recovery of the workpieces held thereon. To this end, the clamp may consist of two parts 20a, 20b (FIGS. 5 and 6) held together by bolts 20c, clamp half 20a being rigid with shaft 19.

The system of FIG. 3 is generally similar to that of FIG. 1 and identical numerals, supplemented by a "1" in the position of the hundreds digit, have been used to identify analogous elements which for the most part need not be further described. In contradistinction to the preceding embodiment, however, sleeve 144 is now positively coupled with the drive shaft 112 of motor 110 whereas the housing of differential 114, whose output shafts 115, 116 are coupled as before with holder shaft 119 and gripper shaft 125, is held stationary. A slight relative rotation of tool ends 21a and 21e is thus possible under torsional stress. The polygonally profiled sleeve 144 extends only slightly forwardly of the region of tool portion 21c and adjoins a stationary sleeve 145 of circular cross-section which receives the workpieces 43 from hopper 142. Sleeve 144 is driven directly from shaft 112 via a spur gear 146 in mesh with gear 114 and keyed to the sleve; gear 146, in turn, drives a gear 147 keyed to shaft 135 which is coupled wite worm-gear shaft 138 via speed-changing and reversing gears 136, 137. The entrance end of sleeve 144 is suitably flared to receive the oncoming nuts from sleeve 145.

Apart from the kinematic reversal as between the tool and the workpieces, the operation of the machine of FIG. 3 is analogous to that of the machine of FIG. 1.

We claim:
1. In a machine for internally threading blanks to form nuts and having a pair of axially aligned spindles provided at confronting ends with gripper means and adapted to engage nut blanks fed between them, one of the spindles carrying a tap for threading a nut blank upon its engagement by the spindles, and common drive means connected with the spindles at their extremities remote from their confronting ends for rotating said spindles jointly, the improvement which comprises torque-equalizing differential means in said drive means between said spindles for affording at least limited relative rotation thereof and equalizing the torque applied thereto by said drive means.

2. A machine for the cutting of female threads in tubular workpieces, comprising axially fixed holder means for clamping an end of a tapping tool; gripper means axially spaced from said holder means at a location beyond the opposite end of a tapping tool engaged by said holder means; inlet means for introducing a workpiece into the space between the tapping tool and said gripper means in a normal retracted position of the latter; pusher means axially reciprocable across said space for moving said workpiece past said opposite end over a thread-cutting portion of said tapping tool; axially displaceable support means carrying said gripper means, said support means being yieldably coupled with said pusher means for entrainment thereby in the initial phase of a working stroke of said pusher means whereby said gripper means is brought into positive engagement with said opposite end of the tapping tool during axial displacement of said workpiece over a distance exceeding the length of said space; sleeve means peripherally engageable with said workpiece for controlling the angular position thereof in the region of said thread-cutting portion; first drive means for relatively rotating said holder means and said sleeve means while maintaining said gripper means in substantially fixed angular alignment with said holder means whereby said tapping tool is subjected to substantially equal torsional stresses at both ends; and second drive means synchronized with said first drive means for reciprocating said pusher means whereby said workpiece is axially advanced in timed relationship with its rotation relative to the tapping tool, said first drive means including a first shaft fixedly secured to said holder means, a second shaft positively connected with said gripper means including a differential gear train, and coupling means interconnecting said shafts with freedom of limited relative rotation.

3. A machine as defined in claim 2, wherein said holder means comprises a clamp provided with a curved channel for accommodating a bent extremity of said tapping tool.

4. A machine as defined in claim 2 wherein one of said drive means is provided with rotation-reversing means.

5. A machine as defined in claim 2 wherein said second drive means includes cam means for axially advancing said pusher means in an initial phase sufficiently to engage said gripper means with said tapping tool, thereafter holding said pusher means stationary in an intermediate phase wherein said workpiece rests on a smooth-surfaced forward portion of said tool, and finally advancing said pusher means to move the workpiece past said thread-cutting portion in a terminal phase of said working stroke.

References Cited
UNITED STATES PATENTS

| | | | |
|---|---|---|---|
| 922,248 | 5/1909 | Bilgram | 10—133 |
| 1,113,444 | 10/1914 | Johnston | 10—129 |
| 1,944,653 | 1/1934 | Clouse | 10—139 |

FRANCIS S. HUSAR, *Primary Examiner.*